(No Model.)

P. MERCIER.
PNEUMATIC TIRE.

No. 561,904. Patented June 9, 1896.

Witnesses,
J. M. Fowler Jr.
Thomas Durant

Inventor
Pierre Mercier,
By Church & Church
his Attorneys

UNITED STATES PATENT OFFICE.

PIERRE MERCIER, OF PARIS, FRANCE.

PNEUMATIC TIRE.

SPECIFICATION forming part of Letters Patent No. 561,904, dated June 9, 1896.

Application filed August 15, 1893. Serial No. 483,212. (No model.) Patented in France April 12, 1893, No. 229,325.

*To all whom it may concern:*

Be it known that I, PIERRE MERCIER, a citizen of the Republic of France, residing at Paris, in the Republic of France, have invented certain new and useful Improvements in or Relating to Pneumatic Tires, (for which I have obtained Letters Patent in France, No. 229,325, dated April 12, 1893,) of which the following is a specification.

The present invention relates to a pneumatic tire for cycle and other wheels. This tire is constructed so as to render it proof against deflation after being accidentally punctured, the puncture immediately and automatically being stopped, so that none of the compressed air can escape.

Figure 2:
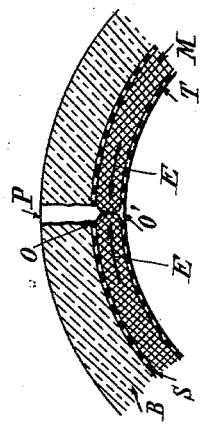
Figure 1:
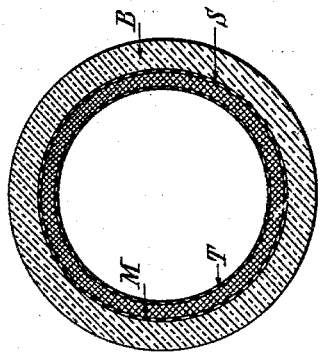

In the accompanying drawings, Figure 1 is a transverse section of the improved tire. Fig. 2 is an enlarged view of a part of the tire, showing, by way of illustration, a hole in the tire closed up automatically.

In carrying this invention into practice there is produced on the interior surface of the tire a sort of distribution or compression of molecules. For that purpose there is used an outer tube B, of preferably vulcanized india-rubber, as usual, which may be lined with canvas at S, and serving as the air-chamber, to which are successively applied two more substances—viz., first, a layer M, which is applied to the tire during its manufacture, and which consists in an elastic material with a tendency to enlarge its volume through the absorption of a certain liquid, as hereinafter more fully explained; second, a suitable liquid to be absorbed by the said layer M for the purpose of expanding the latter, it being applied only after the tire has been vulcanized. In order to facilitate the distribution of the said liquid evenly all over the layer M, and to equalize the air-pressure in the interior in case of puncturing, and with the intention of preventing the interior walls of the tube, when the latter becomes deflated, from adhering together, there is provided a second canvas lining T, which is rigid enough to cause any disturbance in a portion of the periphery to be borne by the neighboring parts.

In the accompanying drawings, B represents an india-rubber tube, which may be vulcanized in the ordinary way and provided with a canvas lining S, and can be applied directly to the wheel with or without a supplementary covering.

The canvas lining S, at the interior of the tube B, is covered with a layer M, consisting, preferably, of india-rubber only slightly vulcanized and capable of absorbing easily any suitable fatty or oily substance. In this stage—*i. e.*, prior to the impregnation of the layer M with the oily substance—the tire is not yet proof against the escape of the air through puncturing, and in order to render it proof I introduce a sufficient quantity of liquefied vaseline. The latter may be used hot, so as to facilitate absorption. The vaseline becomes gradually absorbed by the layer M and tends to enlarge the volume of the latter, resulting in a compression of the molecules. It is therefore clear that the said layer M in being thus compressed will close any hole in the tire, such as shown in P O O', Fig. 2, through the tendency of the molecules in the layer M to push in all directions, as indicated by the arrows E, and to close immediately and automatically such holes, and thereby prevent the escape of the compressed air from the tire. If the india-rubber is thin and supple, the canvas lining may be omitted, and my tire becomes then an ordinary tire, which has been rendered indeflatable by my process.

I claim—

A pneumatic tire for vehicles having a layer of rubber vulcanized and subsequently treated with melted vaseline to cause the closure of punctures; substantially as described.

In testimony whereof I have hereunto set my hand in the presence of the two subscribing witnesses.

PIERRE MERCIER.

Witnesses:
 L. LALLYS,
 ROBT. M. HOOPER.